June 10, 1941.  J. H. BUCKNAM  2,244,822
REMOTE CONTROL SYSTEM FOR BLOWPIPE MACHINES
Filed May 9, 1939  4 Sheets-Sheet 1

INVENTOR
JAMES H. BUCKNAM
BY
ATTORNEY

June 10, 1941.    J. H. BUCKNAM    2,244,822
REMOTE CONTROL SYSTEM FOR BLOWPIPE MACHINES
Filed May 9, 1939    4 Sheets-Sheet 3

| OPERATIONS | POSITIONS OF DRUM CONTROLLER 60 | | | | |
|---|---|---|---|---|---|
| | NEUTRAL | FIRST | SECOND | THIRD | FOURTH |
| Blowpipes In | o  o | ▭ | o  o | o  o | o—o  h² r² |
| Preheat On | o  o | o  o | ▭ | ▭ | o—o  h³ r³ |
| Carriage Motor | ▭ | o  o | o  o | o  o | o—o  j⁴ j³ |
| Close R₁ Relay | o  o | o  o | o  o | ▭ | o—o  h⁴ r¹ |
| Blowpipes Out | ▭ | o  o | o  o | o  o | ▭  h⁵ r⁴ |
| Roll Table Forward | ▭ | ▭ | ▭ | o  o | ▭  f⁸ f⁹ |

INVENTOR
JAMES H. BUCKNAM
BY
ATTORNEY

Patented June 10, 1941

2,244,822

UNITED STATES PATENT OFFICE 2,244,822

REMOTE CONTROL SYSTEM FOR BLOWPIPE MACHINES

James H. Bucknam, Cranford, N. J., assignor to The Linde Air Products Company, a corporation of Ohio Application May 9, 1939, Serial No. 272,555

16 Claims. (Cl. 266—23)

This invention relates to remote control systems for blowpipe machines, and more particularly to an electric system for the remote control of surface conditioning machines, such as machines for thermo-chemically removing surface metal from steel billets, slabs, and the like. While the invention may be applied to various mechanisms employing blowpipe devices for conditioning one or more surfaces of steel slabs or billets in a steel mill by the application of gas streams or for thermo-chemically cutting ferrous metal bodies, the principles of the invention will be described as applied to a mechanism or machine for thermo-chemically desurfacing the four sides of a square billet. Such a machine has been described and claimed in the copending application Serial No. 145,480 filed May 29, 1937, jointly by H. W. Jones, J. H. Bucknam, and E. A. Doyle, now Patent No. 2,210,921.

The sequence of the essential events in the operation of a machine for thermo-chemically removing metal from steel bodies are as follows: 1, the body must be moved into position for beginning the operation; 2, the blowpipe heads of the machine are moved into position adjacent the surface or surfaces; 3, the flow of heating gases is started, the gases ignited and the flames applied for a sufficient time to heat the surface to the ignition temperature; 4, the oxidizing gas is caused to flow and the body moved relatively to the blowpipe heads to remove metal; 5, when the end of the surface is reached the gases should be promptly shut off and the machine prepared for operation on the next steel body.

It has been customary for one or more operators to control the operations of a billet conditioning machine by manipulating a number of control handles such as; a compressed air valve or valves for causing the blowpipe heads to be shifted toward or away from the billet surfaces, separate stop valves for controlling the flow of fuel gas and oxidizing gas for the heating gas mixture, a separate stop valve for controlling the oxidizing gas, and a separate motor starter for controlling the roll table that moves the billet. With the simplest arrangement of individual controls it was not only difficult for the operator to time the events efficiently but it was also possible for errors to be made in the proper sequence that would damage the apparatus and/or spoil the work. When additional operations are added such as providing for the transverse displacement of the desurfacing machine into and out of alignment with the billet conveyor, the control of the machine becomes too complex to be efficiently effected by the individual control means previously employed.

The apparatus, according to the present invention, makes it impossible to improperly operate the mechanism and in addition provides economies by saving time and valuable gases. Thus, no time is lost between successive steps in the operation, the preheating gases are promptly turned on and ignited. The oxidizing gas is applied as soon as the surface is prepared therefor and the billet is moved immediately after the oxidizing gas is turned on so the oxidizing gas is not applied too long at the starting point and finally the gases are promptly shut off when the end of the surface is reached.

This invention has for its principal object the provision of an electrical system for controlling the operation of a surface conditioning, desurfacing, or cutting machine such that a single operator can control the entire operation from a single location.

Other objects are; to provide a semi-automatic electrically interlocking system for controlling the operation of a steel billet or slab conditioning machine substantially by a single controller; to provide such a system by which the operation of the machine is interlocked with the control system for the operation of the billet or slab conveyor or roll table; to provide such a system by which the operation of the roll table is interlocked with the control system of a mechanism for effecting the transfer of the machine into or out of alignment with the path of billets along the roll table; to provide electrical interlocks so that the operations of the conditioning apparatus must occur in the proper sequence; to provide an electrical control so arranged that accidental or inadvertently imposed improper operation can cause no damage to the mechanism.

These and other objects and novel features of this invention will become apparent from the following description and the accompanying drawings, in which.

Figure 1:
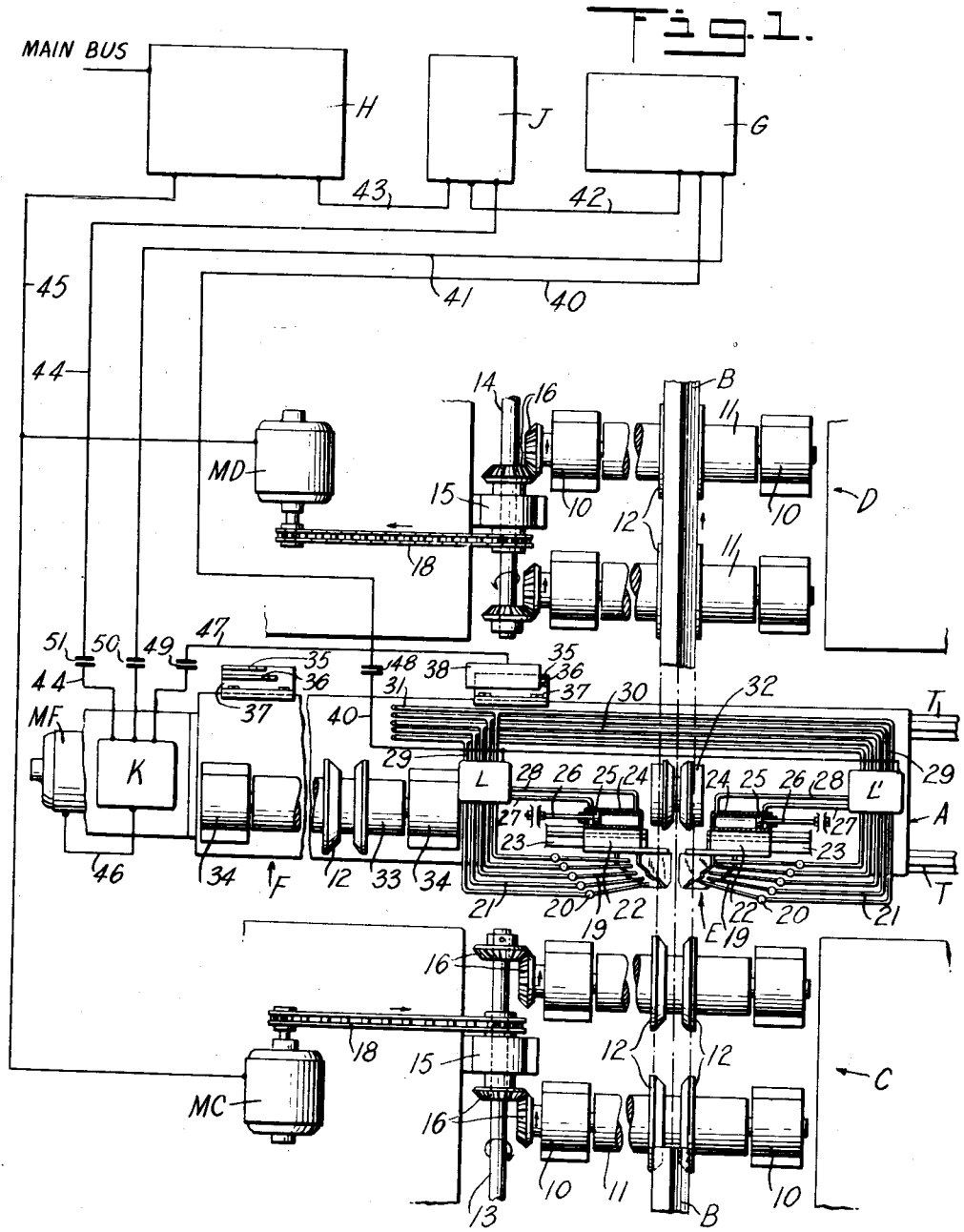
Fig. 1 is a diagrammatic plan view showing portions of a steel mill roll table in which is interposed a desurfacing machine on a transversely movable carriage together with electrical control units according to the invention.

Referring to the drawings and particularly to Fig. 1, the essential features only of a machine for thermo-chemically desurfacing four sides of a square steel billet are schematically shown since the machine is fully described in the co-pending application previously referred to. The desurfacer, shown generally at A, is inserted between two sections of a conveyor or roll table indicated generally at C and D. Portions of the billet that is carried in the diamond position by the roll table are shown at B. The billet B moves from section C to section D of the roll table and passes through a diamond shaped opening formed by the blowpipe heads E of the surfacer A. The desurfacer is supported upon a transversely movable carriage F that runs on the transverse track T so that the desurfacer can be moved to the right out of alignment with the conveyor when it is desired to pass billets along without treatment. The mechanism is entirely controlled by an operator on a platform or pulpit (not shown) on which a control table G is mounted and located so that a clear view of the operation is had.

The conveyor sections C and D comprise a plurality of supporting bearings 10 in which are journaled the rollers 11 for supporting and moving the billets B from a blooming mill or stand of rolls of a rolling mill through the conditioning apparatus A directly to the next roll stand or to the finishing rolls of the mill. The rollers 11 in the conveyor sections C and D have flanges 12 spaced to support the billets in the diamond position and may be driven by variable speed motors MC and MD, respectively, connected to drive shafts 13 and 14. Each roller 11 is connected by bevel gears 16 to a respective main drive shaft 13 or 14 carried by bearings 15. The motors MC and MD are preferably geared to shafts 13 and 14 by chains 18.

The desurfacer A carries oxidizing gas delivering means constructed and arranged to simultaneously desurface in a single pass through the machine, the four sides of each of the billets B. Such gas delivery means may consist of four spaced and opposed desurfacing heads E, forming a diamond-shaped opening. Each head E has a group of blowpipes therein having nozzles disposed adjacent the four sides of the billet and is in the form of a heavy box-like protector for the blowpipes and nozzles, substantially enclosing them on all sides except the top where the supplying tubes 19 are connected. The supply tubes or connections 19, of which there are five for each blowpipe, connect to a set of five corresponding manifolds 20, there being a set of manifolds for the left-hand pair of heads E and another set for the right-hand pair of heads. Of the five manifolds of each set, one is for the supply of desurfacing oxygen; another is for the supply of fuel gas; a third is for the supply of oxygen to form a combustible mixture with the fuel gas; and the fourth and fifth are for the supply and discharge of cooling water. The left-hand manifolds 20 are connected by a corresponding number of conduits 21 to valve mechanisms within a valve housing L on the carriage F. The right-hand manifolds 20 are severally connected by conduits 21 to valves in a similar housing L'.

The right-hand and left-hand heads E are respectively secured to right-hand and left-hand carriers 22 which are movably mounted on horizontal slide-ways 23 of the desurfacer. The carriers 22 are therefore horizontally slidable toward and away from each other so that the heads E can be moved toward and away from the billets B. The movement of the carriers 22 is effected by power cylinders 24, one of which is mounted on the back of each carrier 22. The power cylinders 24 are sectioned to show their respective pistons 25 which are held stationary by the piston-rods 26 that are secured to the supporting members of the desurfacer. To move the heads E toward the billet, a fluid, preferably oil, under pressure is delivered into the rod end of each cylinder 24 by flexible conduits 27 and permitted to flow out of the head end of each cylinder through flexible conduits 28. Conduits 27 and 28 connect with control valves in the valve housings L and L', respectively, which are hereinafter more fully described. The several operating fluids including oil, water, and gases are supplied to the valves in housings L and L' by branch conduits 29 of the corresponding five supply conduits 30 which are connected to a stationary supply source by flexible hose portions at 31 arranged to permit the desurfacer A to be moved through the desired range of transverse movement.

The carriage F on which the desurfacer is mounted has wheels running on the rails T, which wheels are driven by the reversible motor MF secured at the left end of the carriage F. The carriage F also supports idler rollers, one idler roller 32 being mounted behind heads E in order to furnish additional support for the billet B when it passes through the desurfacer, and another idler roller 33 on the portion to the left of the desurfacer A. The roller 33 is similar to the rollers 11 but is without driving means and is mounted in bearings 34 although it may be individually motor driven if necessary. When the carriage F is moved to the right the flanges 12 of the roller 33 are aligned with the flanges 12 of the rollers 11. The rightward or leftward limits of movement of the carriage F are accurately determined by two pairs of cams 35 and 36 mounted on brackets 37 which are secured to the side of the carriage F at the proper location. The cams 35 and 36 engage with limit-switches within housing 38 which is stationarily supported.

The electrical cables or conduits only are indicated by single heavy lines in Fig. 1, the detailed wiring being illustrated in the remaining figures. In Fig. 1 is shown a cable 40 running from control table G to both valve housings L and L'. A second cable 41 connects control table G with a junction box K mounted on the carriage F above the motor MF. The third cable 42 connects the control table G with a junction box J which is connected by cable 43 with the conveyor motor starter H. Junction box J is also connected with junction box K by a cable 44. The two conveyor motors MC and MD are electrically connected for simultaneous operation by a cable 45 leading from the conveyor motor starter H and having branches to each motor. A cable 46 connects the carriage-motor junction box K with the carriage motor MF and a cable 47 connects the carriage-motor junction box K with the limit-switches in the housing 38. The breaks 48, 49, 50, and 51 are to indicate that suitable flexible portions are inserted at these points in the respective cables 40, 47, 41, and 44 to permit transverse movement of the carriage F.

Figure 2:
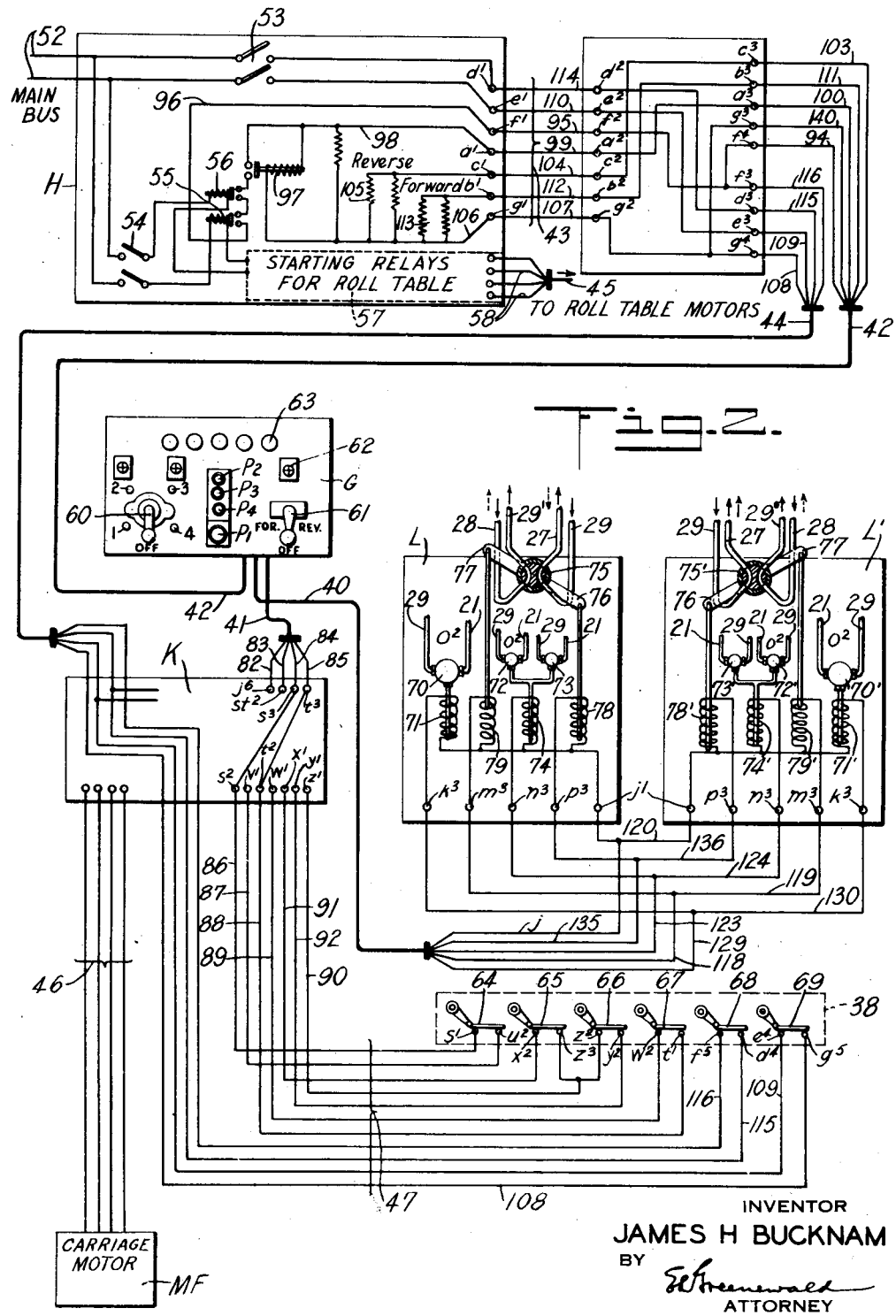
Fig. 2 is a diagrammatic view showing the electrical control units on a larger scale and their electrical interconnection.

The electrical control apparatus is shown in greater detail in Fig. 2. The main bus 52 supplying the power enters the conveyor motor-starter housing H and connects the two double-pole single throw-knife switches 53 and 54. The two poles of switch 54 are connected respectively in series with two magnetic switches 55 and 56 and to the starting relays 57 for the roll-table motors MC and MD. The starting relays 57 for the roll-table motors are not shown in detail since they are of the customary type and form no part of the present invention. Four conductors lead from the starting relays through the cable 45 and are connected to both motors MC and MD.

The control table G (Figs. 2 and 3) is provided with a drum controller 60, the handle of which may be moved into each of five successive positions and is shown in Fig. 2 in the off or neutral position. A controller 61 for the roll table is provided at the right-hand portion of the control table G. Also on the control table G are pushbuttons P1, P2, P3, and P4, located between the controllers 60 and 61. Three signal lamps 62 and a row of fluid-pressure gauges 63 are also provided. The limit-switches in housing 38 are six in number and are shown at 64, 65, 66, 67, 68, and 69. In each housing L and L' is located a solenoid-operated oxygen-control valve 70 and 70', respectively. Also disposed in each housing is a pair of preheating gas-control valves 72, 73, and 72', 73', each pair being simultaneously controlled by respective solenoids 74 and 74'. The oxygen valves 70 and 70' are controlled by the solenoids 71 and 71'. The conduits 27 and 28 of each power cylinder 24 are connected to diametrically opposite openings of a four-way valve 75 and 75' in each housing. The other two openings of the valves 75 and 75' are connected to the oil inlet units of conduits 29 and oil outlet conduits 29'. The rotor of each four-way valve is provided with operating arms 76 and 77 which are controlled by solenoids 78, 79, and 78', 79', respectively. When the solenoids 78 and 78' are energized, the arms 76 are pulled down to the position shown and oil under pressure is delivered to conduits 27 and to the rod ends of power cylinders 24 thus moving the blowpipes away from each other. When solenoids 79 and 79' are energized, the valves 75 and 75' are reversed so that the oil inlet branches 29 are connected to conduits 28. The outlet branches 29' are simultaneously connected to conduits 27 and oil under pressure will enter the head ends of the cylinders 24 and leave the rod ends so that the blowpipe heads E will be moved toward each other.

Figures 3, 4:
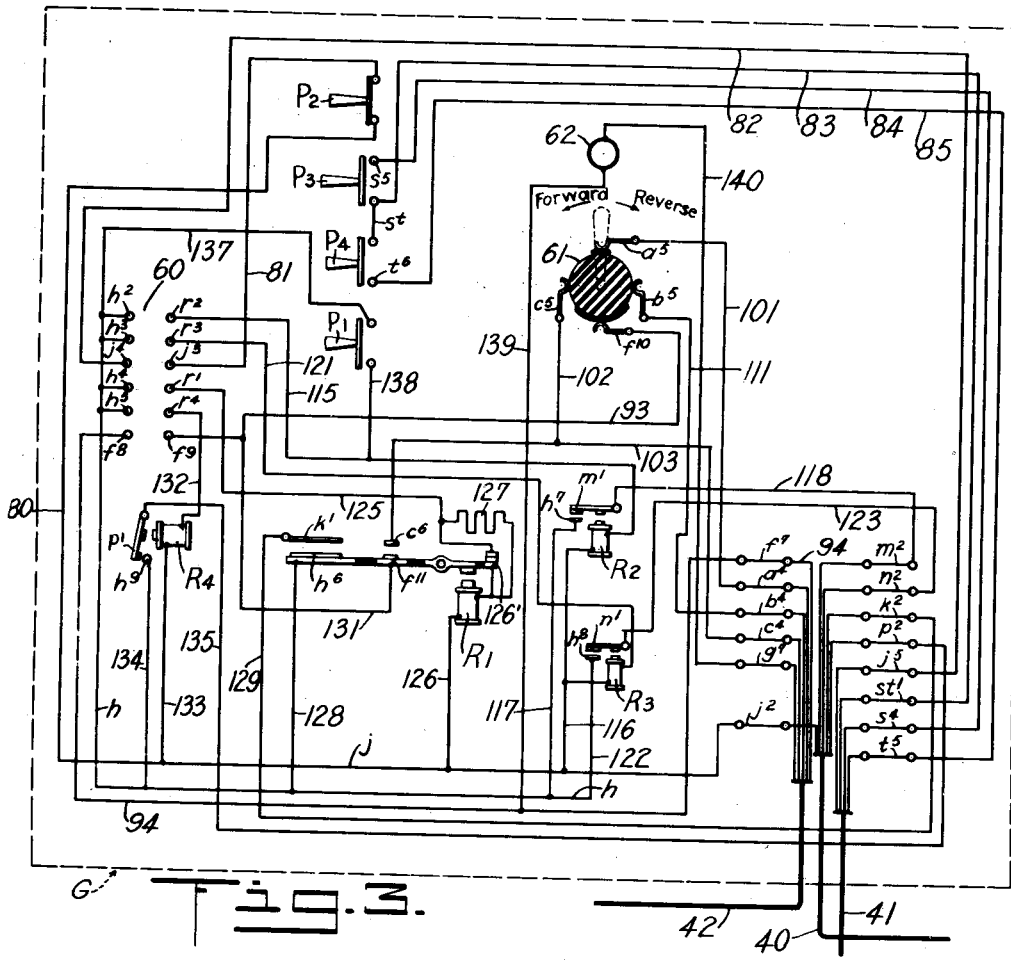
Fig. 3 is a wiring diagram of the control table unit.
Fig. 4 is a diagram illustrating the successive positions of the drum controller.

When the controller handle 60 is in the off or neutral position, only the contacts j3, j4, and j8, j9 of the drum controller are connected together as illustrated in Fig. 4. This permits the carriage motor MF to be operated as described by the push-buttons P2, P3, and P4. It also permits the roll table to be operated as desired. The push-button P2 remains normally closed, therefore, the closing of contacts j3 and j4 completes a circuit from line j through lines 80, 81, 82, to terminal j5 and through line 82 of conduit 41 to terminal j6 of the carriage motor-starting box K. When push-button P3 is closed, terminals st are connected with terminal s5, thus connecting lines 83 and 84 which connect to terminals st1 and s4, respectively, and then through conduits 41 to the carriage motor-starting box K where line 84 is connected to terminal s3 which in turn connects with terminal s2. Terminal s2 is connected to terminal s1 of the limit-switch 64 by a line 86. If the carriage F is in the leftward position as shown, the limit-switch 64 will not be engaged by a cam 35 of the housing 38 and terminals s1 and u2 will remain connected by the switch 64 so that the circuit will be completed through lines 87 to terminal v1 of starting box K. Relays in the box K will thereby be energized to supply power to the carriage motor through two of the four lines 46, in order to drive the carriage to the right. If, however, push-button P4 is depressed, closing contacts st and t6, lines 84 and 85 are connected together. The line 85 leads to terminal t5 through conduit 41 to terminal t3 of starting box K which terminal is connected with terminal t2 and terminal t1 of limit-switch 67 by line 88. If switch 67 is closed, as it will be when the carriage F is away from the leftward position, the terminal t1 is connected with terminal w2 which connects to terminal w1 of starting box K through line 89. This completes the circuit through other starting relays of terminal box K to energize the other two lines of conduit 46 and cause the carriage motor to run in the opposite direction, i. e., move the carriage F toward the left. The movement of the carriage F continues until the engagement of limit-switch 67 with a cam 35 breaks the circuit by disconnecting terminals w2 and t1. The limit-switches 65 and 66 are provided for slowing down the motor MS before the limit-switches 64 and 67 are operated. The switches 65 and 66 remain closed during the time they are out of engagement with the cams 36. The contacts z2 and z3 of the switches are connected to terminal z1 of box K by line 90. The terminals x1 and y1 are respectively connected with the contacts x2 and y2 by lines 91 and 92, respectively. The terminals x1, y1, and z1 are connected with the controlling coils of suitable relays, not shown, in terminal box K for cutting suitable resistances into the circuit of the carriage motor MS in order to slow it down when the control circuit is broken by the operation of either switch 65 or 66 according to the direction in which the carriage F is traveling.

The only position in which the terminals j1 and j4 are connected is in the off position of the controller 60. Thus, the carriage motor cannot run when the controller is in any other position. The contacts j8 and j9, however, remain closed for all positions of the controller 60 except the third position. The closing of contacts j8 and j9 connects the contact j10 of the controller 61 through lines 93 and 94, terminal j7, line 94 of conduit 42, terminal j4 of junction box J which is connected with terminal j2, line 95 to terminal f1 of the roll-table starter H. From terminal f1, the circuit is continued through line 96, through the closed terminals of relays 55 and 56, through the closed switch 97 and line 98 to terminal a1. The circuit continues from terminal a1 to a2 by line 99 to terminal a3 and by line 100 in conduit 42 to terminal a4 of control table G. Terminal a4 is connected to contact a5 of the controller 61, by line 101. When the handle of the controller 61 is in the middle position, contactors a5 and f10 are connected together so that the roll-table motors can be controlled by another operator. When the handle of the controller 61 is rotated to the right or toward the reverse position, the contactors c5 and f10 are connected together. The line 93 is thereby connected with lines 102 and 103 which connect contactor c5 through terminal c4, line 103 of cable 42, terminals c3 and c2 of junction box J, line 104, terminal c1 and through the coils of a pair of relays 105 in parallel to line 106. This circuit is completed through line 106 connected to terminal g1, line 107 connecting terminals g1, g2, and g4, line 108 in conduits 44 and 47 to terminal g5 of the limit-switch 69. The limit-switch 69 is closed by contact with either of cams 35 and is open circuited only when the carriage F is away from either extreme position. Terminal g5 is thereby connected with contact e4 which, through lines 109 and 110, connects successively to terminals e3, e2, and e1. The terminal e1 in starter H is connected to one pole of the switch 53.

When the handle of the controller 61 is in the forward position, contactors f10 and b5 are connected together so that the circuit is closed between lines 93 and 111. This circuit includes terminals b4, b3, and b2 (in box J), line 112, terminal b1 in starter H through the parallel coils of a pair of relays 113 which are connected to line 106 and to terminal g1 which connects through limit-switch 69 to terminal e1 as previously described. The limit-switch 68 operates simultaneously with switch 69 for preventing the operation of the roll table unless the carriage F is in the proper end position. Thus, when switch 68 is closed, a circuit is completed between terminal d1 through line 114, terminals d2, d3, line 115, contact d4 of limit-switch 68 which is connected with contact f5. Contact f5 is connected by line 116 with terminals f3 and f2 of junction box J which are connected by line 95 to terminal f1. In starter H, terminal f1 connects by lines 96 and 98 through switches 55, 56, and 97 to terminal a1. Terminal a1 connects to contactor a5 of the controller 61 in control table G through lines 99, 100 in conduit 42, and line 101. The signal lamp 62 is energized by being in circuit through lines 139 and 140 across lines 94 and 106 through terminal g7, line 140 in conduit 42, terminals g3, g2, line 107, and terminal g1. The lamp thus lights when the magnetic switches 55, 56, and 97 are closed and when limit-switches 68 and 69 are closed to indicate that the roll-table motor can be operated by the controller 61.

When the desurfacer A is positioned into alignment with the billet conveyor and a billet B has been moved along the conveyor by shifting the controller 61 into the forward position until the end of the billet reaches the heads E, the handle of controller 60 can be moved from "off" to the first position. In this position, the contacts r2 and h2 are closed. This closes a circuit from the line h through contacts h2, r2 and line 115 to the relay R2, the other pole of the relay R2 being connected by line 116 to line j. The relay R2 is thus energized, closing contacts h7 and m1 making a closed circuit through lines 117, 118, terminals m2, through conduit 40, and branch line 119 to terminals m3. Then from terminals m3 through solenoids 79 and 79' which have their other terminals connected with terminals j1. The circuit is completed to line j by branch line 120. The energizing of solenoid 70 turns the valve 75 as previously described, so that the blowpipe heads E are moved toward the billet and contact with the surface of the billet near the end thereof.

The controller handle 60 is now moved to the second position, and the contacts h2 and r2 are opened. The contacts h3 and r3 then close, completing a circuit between line h through line 121 to the coil of relay r3 which is also connected through line 116 to line j. The energizing of relay R3 closes contact points h8 and n1. This completes the circuit from line h through lines 122 and 123, terminal n2, through conduit 40, and branch line 124 to terminals n3. The solenoids 74, and 74' being connected across terminals n3 and j1 are energized, opening simultaneously the stop valves 72, 73 and 72', 73' for the oxygen and acetylene that form the preheating gas mixture. The gases flow from the respective branch conduits 29 through conduits 21 and connection tubes 19 to the blowpipes in heads E where the gases are mixed and issue as combustible gas flames from the nozzles of the heads. The combustible gas is directed toward the surface of the billet B and ignited by the hot metal. However, if the metal is not hot enough, the gases may be ignited by suitable means such as a pilot light or by an electrical spark.

When the preheating flames have heated local areas of the surface to the ignition temperature, which ordinarily will require but a few seconds, the controller handle 60 is moved to the third position. In the third position, the contacts f8 and f9 are disconnected. The contacts h3 and r3 remain connected so that the preheating flames remain on and the contacts h4 and r1 are closed. This completes the circuit from line h to line 125 and contact points 126' to one terminal of the relay core R1, the other terminal of which is connected by line 126 to line j. The energization of relay R1 breaks contacts 126' and permits the current to flow through a resistor 127 to reduce the current flow through relay coil R1 to a valve which is only sufficient to hold the contact points f11, c6, and h6, k1 closed. Closing of contacts h6 and k1 completes the circuit from line h through lines 128 and 129, terminal k2 through conduit 40 and branch lines 129 and 130 to the terminals k3. The solenoids 71 and 71' are connected across terminals k3 and j1 and are thus energized to open the oxygen valves 70 and 70'. The oxygen thereupon flows through one of conduits 29, 21 and one of connection tubes 19 to the main oxygen passages of the blowpipes in the headers E. The oxygen which impinges upon the heated surface metal oxidizes a layer of the surface metal and converts it into a fluid slag which flows off the surface. The operation of the relay R1 also closes contacts f11 and C6 which are connected in parallel with the contactors c5 and f10 by lines 103, 102 and 131, 93. This, as previously described, energizes relays in the conveyor motor-starting box H to cause the motors MC and MB to move the conveyor rolls 11 in the forward direction at a predetermined desurfacing speed. The drum controller 60 remains in the third position during the passage of the billets B through the machine. Thus, a uniform surface layer of metal is removed from the entire billet.

When the trailing end of the billet B reaches the head E, the controller 60 is moved to the fourth position. The contacts h3 and r3 are open-circuited so that relay R3 opens and the solenoids 74 and 74' release the valves 72, 73, and 72', 73', so, that they close and shut off the flow of the preheating gases. At the same time the contacts h4 and r1 are open-circuited so that the relay R1 is de-energized, contacts h6 and k1 are open-circuited and the solenoids 71 and 71' de-energized so that the oxygen supply valves 70 and 70' close. Contacts c6 and f11 are also open-circuited and the motors MC and MD are de-energized to stop the conveyor table. In the fourth position of controller 60, the contacts h5 and r4 are closed-circuited which energizes the relay R4 through lines 132 and 133. The energizing of relay R4 closes contacts p1 and h9 so that a circuit is made from line h through lines 134, 135, terminals p2 through conduit 40 and line 136 to terminals p3. This energizes the solenoids 78 and 78' connected across terminals p3 and j1 and operates the valves 75 and 75' to cause the heads E to move outward to the non-operating position away from the billet B. In the fourth position of the controller 60, the contacts f8 and f9 are again closed so that the movement of the controller 61 will be effective to operate the conveyor roll table to move the desurfaced billet B as desired for further processing treatment in the mill.

Figure 5:
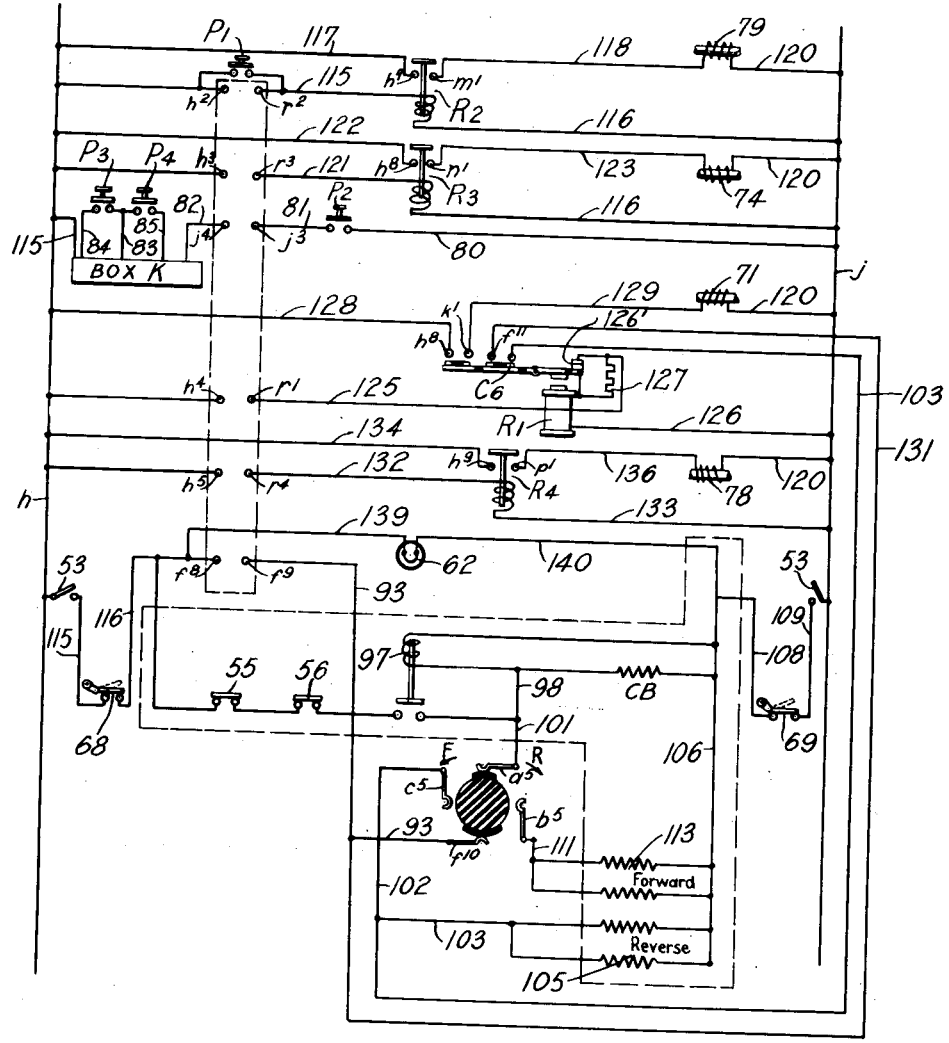
Fig. 5 is a simplified wiring diagram of the essential electrical units.

The push-button P1 is shunted across the terminals h2 and r2 by lines 137 and 138. Therefore, when the push-button P1 is closed-circuited, relay R2 is energized to move the blowpipe heads E toward each other if it should be desired to do so while the controller handle 60 is in another position than the first or fourth. The next movement of the controller handle 60 returns the handle to the neutral position in which position the contacts f3 and f4 and f8 and f9 are closed-circuited so that the carriage F, by operation of push-button P3, can be moved to the right if it should be desired to pass the next billet along the conveyor without subjecting it to a surface treatment. In some instances it may be desirable to insure that the heads E will remain in the outward position away from the billet when the controller 60 is in the neutral position. This can readily be accomplished by arranging the contactors of the controller so that contacts h5 and r4 remain connected as indicated by broken lines at 141 in Fig. 4. In the schematic diagram of Fig. 5 the same features are shown and similarly identified. The parts however, have been differently placed and the connections therefore greatly simplified.

From the above description it will be seen that the desurfacing apparatus is made to go through a complete cycle of operation by moving a single controller handle 60 through successive positions. The number of positions of the handle 60 depends upon the number of successive events occurring at different times, some of the positions initiating two or more events simultaneously and a complete revolution of the handle 60 causing a complete cycle of operation. The controller 60 is preferably reversible so that certain operations can be initiated independently of the others, if desired, without going through the complete cycle from the beginning.

Certain positions of the controller 60 are electrically interlocked with the roll-table motor control and with the transverse carriage motor control so that these motors can be operated only at the proper times. Briefly the cycle of operation is as follows: With the handle 60 in the neutral position, the control circuits of the carriage motor MF and the roll-table motors MC and MD may be closed, i. e., by the operation of push-buttons P3 or P4, the carriage F is moved to the right or to the left, respectively. While the carriage F is moving the limit-switches 68 and 69 are open-circuited to prevent operation of the motors MC and MD so that billets B cannot be moved along the roll table unless either the desurfacing machine A or the roller 33 are in position. When either the machine A or roller 33 are in alignment, the roll table may be operated to move billets in either direction by control handle 61 which is employed to move a billet into position.

When the billet is positioned the handle 60 is moved to the first step, the carriage motor MF circuit is broken and relays are energized to cause a fluid-pressure impulse to move the blowpipe heads E into position against the surfaces of the billet B. Movement of handle 60 to the second step closes a circuit that opens both oxygen and fuel-gas valves for providing heating flames at the nozzles to initiate the reaction. The flames are ignited by the hot surface of the billet or by an electric spark initiated simultaneously with the turning on of the gases. The third position, to which the handle 60 is moved when the surface metal reaches an ignition temperature, closes another circuit that causes relays to open the main oxidizing gas valves. At the same time the normal roll-table motor-control circuit of controller 61 is broken and the relay that opens the oxidizing gas valves also closes the control circuit of the roll-table motors MC and MD to cause them to move the billet B in the forward direction toward the heads E at desurfacing speed. This position is maintained until the rear end of the billet is reached. The handle 60 is then moved to the fourth position and all circuits are opened except the circuit through the controller 61 so that by operating the controller 61 the billet B can be moved along the roll table in either direction. The preheating and oxidizing gases will be immediately shut off and another circuit is closed to apply fluid pressure for moving the blowpipe heads E away from each other. The final movement of the handle 60 brings it back to neutral position. The controller 60 is made reversible at least to the extent of the positions immediately to the left or right of neutral so that the blowpipe heads E can be moved inward or toward each other or outward, respectively, without going through the other operations.

The particular arrangement herein described and illustrated in the accompanying drawings, is presented as an example of how the principles of the invention are applied to control a desurfacing machine for removing metal from four sides of billets. Other arrangements of the control system embodying the principles of the invention can be made to suit different machines. For example, a similar electrical control system can be applied for controlling the operation of a machine for desurfacing the lateral edges of billets or slabs; a mechanism for desurfacing one face or both faces of a horizontally supported slab; and any machine for conditioning a surface or surfaces of steel shapes which employs blow pipes for applying gas streams to such surface or surfaces and in which the blowpipes are movable toward and away from the surface and relatively moved with respect to the steel shape along the surface. Such other conditioning machine may, for example, be a machine for removing scale from the surfaces of steel bodies by the application of high-temperature flames. It is also contemplated that a drum controller with suitable electrical connections embodying the principles of the invention may be arranged to control the operation of other blowpipe machines such as a machine for flame-cutting steel slabs, billets, or bars in which a similar cycle of events is to be controlled.

It will be seen that other operations or events may also be controlled by arranging suitable contactors for operation by the drum controller in the desired sequence at the same positions of the drum or by additional positions as for raising or lowering the heads E.

It is also contemplated that some or all of the movements of the drum controller from one position to the next may be automatically timed by suitable timing mechanism, for example, the time from the first to the second position may be automatically fixed to that just sufficient for the blowpipe heads to be moved toward the surface which timing may be arbitrarily predetermined. The time that the drum controller is held in the second position may be predetermined to that required to effect heating to the ignition temperature under the conditions of operation, and the time that the third position is maintained may be determined automatically by suitable means.

I claim:

1. Apparatus for controlling the operation of a blowpipe machine such as a machine for conditioning the surface of steel shapes by the application of gas streams, said machine including blowpipe means, means controlling the flow of gases to said blowpipe means, means for supporting and moving said blowpipe means toward and away from said surface, and means for relatively moving said shapes and said blowpipe means along said surface, which apparatus comprises a controller movable through a series of successive positions including an off position and devices connected to said controller for operation at certain of said positions, said devices being sufficient in number and so connected that movement of said controller initiates a series of control impulses causing said blowpipe moving means to move said blowpipe means toward said surface, operating said gas control means to supply gases to said blowpipe means, energizing said relative moving means to relatively move said steel shape and said blowpipe means at a uniform speed, operating said gas control means to stop the flow of gases, and causing said blowpipe means to move said blowpipes away from said surface.

2. Apparatus for controlling the operation of a blowpipe machine such as a machine for conditioning the surface of steel shapes by the application of gas streams, said machine including blowpipe means, means controlling the flow of gases to said blowpipe means, means for supporting and moving said blowpipe means toward and away from said surface, and means including at least one electric motor for relatively moving said shapes and said blowpipe means along said surface, which apparatus comprises a controller movable through a series of successive positions including an off position and devices connected to said controller for operation at certain of said positions, said devices being sufficient in number and so connected that movement of said controller initiates a series of control impulses causing said blowpipe moving means to move said blowpipe means toward said surface, operating said gas control means to supply said gases to said blowpipe means, energizing said electric motor to relatively move said steel shape and said blowpipe means at a uniform speed in the operating direction, operating said gas control means to stop the flow of gases, and causing said blowpipe means to move said blowpipe away from said surface; a second controller having off, forward and reverse positions electrically connected with motor starting apparatus for controlling the operation of said electric motor; and means connected with said first-named controller for connecting said second controller in circuit with said starting apparatus at all positions thereof except that which energizes said electric motor to move forwardly in the operating direction.

3. Apparatus for controlling the operation of a de-surfacing machine having blowpipe means for projecting a combustible gas mixture and oxidizing gas against a surface of a steel body, means controlling the flow of combustible gas mixture to said blowpipe means, means controlling the flow of oxidizing gas to said blowpipe means, means for supporting and for moving said blowpipe means toward and away from said surface, and means for relatively moving said body and said blowpipe along said surface in a forward or reverse direction; which apparatus comprises a controller movable through a series of successive positions including an off position; and electrically operated devices having motor elements connected for energization by said controller when moved into positions other than said off position; said devices being sufficient in number and so connected and arranged for applying control impulses to said moving and controlling means when said controller is moved to said successive positions that said blowpipe means is moved toward said surface at a first position, said combustible gas mixture is caused to flow at a second position, said oxidizing gas is caused to flow and said relative moving means energized to effect relative longitudinal movement at a uniform predetermined speed in the forward direction at a third position, and both heating gas-mixture flow and oxidizing gas flow are stopped, said relative moving means is de-energized, and said blowpipe means moved away from said surface at a fourth position.

4. Apparatus for controlling the operation of a desurfacing machine according to claim 3 in which said controller is reversible only between said off position and said first and fourth positions.

5. Apparatus for controlling the operation of a desurfacing machine according to claim 3 which includes at least one electric motor for operating said lengthwise moving means; a motor-control switch having off, forward, and reverse positions electrically connected by motor-starting apparatus with said motor; and means maintaining the electrical connection of said control switch with said motor-starting devices at all positions of said controller except said third position.

6. Apparatus for controlling the operation of a desurfacing machine according to claim 3 in which said devices comprise at least one fluid-pressure power cylinder having relatively movable members connected respectively to said blowpipe means and said supporting means; and at least one magnetically operated fluid-pressure control valve connected with said power cylinder for supplying pressure fluid thereto.

7. Apparatus for controlling the operation of a desurfacing machine according to claim 3 in which said devices comprise at least one magnetically operated valve for controlling the flow of oxidizing gas; and at least one magnetically operated valve for controlling the flow of said heating gas mixture.

8. Apparatus for controlling the operation of a desurfacing machine according to claim 3 in which said devices comprise at least one fluid-pressure power-cylinder having relatively movable members connected respectively to said blowpipe means and said supporting means; and at least one magnetically operated fluid-pressure control-valve connected with said power cylinder for supplying pressure fluid thereto, each of said valves being operatively connected with two magnetic motor elements and having ports for directing the flow of fluid to and from said cylinders in either of two directions, one of said motor elements being connected for energization when said controller is in the first position and the other of said motor elements being connected for energization at the fourth position of said controller, and the fluid connections to said valves being arranged so that the blowpipe means is moved toward said surface when said valve is operated by said one motor element and the blowpipe means is moved away from said surface when said valve is operated by said other motor element.

9. Apparatus for controlling the operation of a desurfacing machine according to claim 3 which includes at least one electric motor for operating said lengthwise moving means; motor starting apparatus for controlling the operation of said motor; and relays electrically connecting the motor elements of said devices with a source of electric power when energized at said successive positions of the controller, said relays comprising a single circuit closing relay energized in said first position only, a single circuit closing relay energized in said second and third positions only, a double circuit closing relay energized in said third position only, and a single circuit relay energized in said fourth position only, said double circuit relay having contacts for close-circuiting the motor element of the device that causes the oxidizing gas to flow and contacts for close-circuiting that portion of said motor starting apparatus which causes forward movement of the lengthwise moving means.

10. Apparatus for controlling the operation of a desurfacing machine according to claim 3 in which said desurfacing machine includes a conveyor for horizontally supporting and lengthwise moving said steel body; electric motor means for operating said conveyor; a transversely movable carriage supporting said blowpipe means for moving said blowpipe means to either of two limit positions respectively in alignment with said conveyor and out of alignment with said conveyor; an electric motor for moving said carriage; and electric switch means connected for close-circuiting said conveyor motor only when said carriage is at either one of said limit positions.

11. Apparatus for controlling the operation of a desurfacing machine according to claim 3 in which said desurfacing machine includes a conveyor for horizontally supporting and lengthwise moving said steel body; electric motor means for operating said conveyor; a transversely movable carriage supporting said blowpipe means for moving said blowpipe means to either of two limit positions respectively in alignment with said conveyor and out of alignment with said conveyor; an electric motor for moving said carriage; electric switch means connected for close circuiting said conveyor motor only when said carriage is at either one of said limit positions; electric motor starting apparatus for controlling said carriage motor; and means connecting said apparatus with said controller for open circuiting said apparatus and carriage motor in all positions of said controller except the off position whereby said carriage motor is operable only when the controller is in the off position.

12. Apparatus for controlling the operation of mechanism for conditioning the surface of steel bodies by the application of gas streams said mechanism including a conveyor for supporting and lengthwise moving said steel bodies, blowpipe means for projecting gas against the surfaces of said bodies, a transversely movable carriage for supporting said blowpipe means and for moving said blowpipe means into and out of alignment with said conveyor means, electric motor means for operating said conveyor, and an electric motor connected to move said carriage transversely, which apparatus comprises a starting apparatus for starting and controlling the direction of movement of said conveyor motor means; a starting device for controlling the starting and direction of movement of said carriage motor; electric limit-switches operable by movement of said carriage to either limit position for close circuiting said conveyor motor-starting apparatus only when said carriage is at either limit of movement; and another pair of electric limit-switches operable by movement of said carriage connected in circuit with said carriage motor-starting device for stopping said carriage motor when said carriage reaches one of the limit positions, one of said pair being open circuited at one limit position and the other of said pair being open circuited at the opposite limit position.

13. Apparatus for controlling the operation of mechanism for conditioning the surface of steel bodies according to claim 12 which includes a third pair of limit-switches operable by movement of said carriage and electrically connected with said carriage motor-starting device for reducing the speed of said carriage motor when the carriage approaches either limit position.

14. An electrical control system for controlling the operation of a blowpipe machine having blowpipe means for applying a surface conditioning gas against the surface of steel shapes comprising separate electrically operable means for controlling the movement of the blowpipe means on said machine toward and away from said surface, for controlling the turning on and off of the surface conditioning gas of said blowpipe means, and for controlling the stopping and starting of the relative movement of said blowpipe means along said surface in the operating direction; a source of electricity; and a manually movable controller interposed between said source and said electrically operable means for correctly sequentially closing and opening the circuits to said electrically operable means when moved through a series of successive positions said controller including an intermediate position arranged for simultaneously closing the circuits for turning on surface conditioning gas and for starting the relative movement of said blowpipe means along the surface in the operating direction.

15. An electrical control system for controlling the operation of a blowpipe machine having blowpipe means for applying surface conditioning gas against the surface of steel bodies comprising separate electrically operable means for controlling the movement of said blowpipe means toward and away from said surface, for controlling the turning on and off of the surface conditioning gas of said blowpipe means, and for controlling the starting and stopping of mechanism including an electric motor effecting relative movement at an operating speed between said body and said blowpipe means in an operating direction along said surface; a source of electricity; a manually movable controller interposed between said source and said electrically operable means for correctly sequentially closing and opening the circuits to said electrically operable means when moved through a series of successive positions; a second manually operable controller interposed between said source and said electric motor for independent control of said relative moving means; and means for open circuiting said second controller when said first controller is moved to the position that closes the circuit of said means for controlling the starting of said electric motor for effecting said relative movement at operating speed.

16. An electrical control system for controlling the operation of a blowpipe machine having blowpipe means for applying surface conditioning gas against the surface of a steel body comprising separate electrically operable means for controlling the movement of said blowpipe means toward and away from said surface, for controlling the turning on and off of the surface conditioning gas of said blowpipe means, and for controlling the starting and stopping of mechanism including an electric motor arranged for effecting relative movement at an operating speed between said body and said blowpipe means in an operating direction along said surface; a source of electricity; a manually movable controller interposed between said source and said electrically operable means for correctly sequentially closing and opening the circuits to said electrically operable means when moved through a series of successive positions, said controller including an intermediate position arranged for simultaneously closing the circuits for turning on said surface conditioning gas and for starting the relative movement of said blowpipe means along the surface in the operating direction; a second manually operable controller interposed between said source and said electric motor for independent control of said relative moving means; and means for open circuiting said second controller when said first controller is moved to said intermediate position.

JAMES H. BUCKNAM.